(12) United States Patent
Winters et al.

(10) Patent No.: US 9,109,774 B1
(45) Date of Patent: Aug. 18, 2015

(54) SYSTEMS, METHODS AND DEVICES FOR AN LED LIGHTING MODULE WITH A LIGHT TRANSMISSIVE COVER

(75) Inventors: Philip Dean Winters, Senoia, GA (US); Hung Dinh, Lawrenceville, GA (US); Reed Alan Bradford, Peachtree City, GA (US); Sylvia Herman, Peachtree City, GA (US); Christopher Ladewig, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 222 days.

(21) Appl. No.: 13/554,956

(22) Filed: Jul. 20, 2012

Related U.S. Application Data

(60) Provisional application No. 61/509,951, filed on Jul. 20, 2011.

(51) Int. Cl.
| | |
|---|---|
| *F21V 5/00* | (2006.01) |
| *F21S 4/00* | (2006.01) |
| *F21V 21/00* | (2006.01) |
| *G02B 19/00* | (2006.01) |

(52) U.S. Cl.
CPC ............ *F21V 5/007* (2013.01); *G02B 19/0066* (2013.01)

(58) Field of Classification Search
CPC ......... F21V 5/007; F21V 5/008; F21V 5/046; G02B 6/0021; G02B 19/0028; G02B 19/61; G02B 19/66

USPC .............................. 362/235, 236, 244, 249.02
See application file for complete search history.

(56) References Cited

U.S. PATENT DOCUMENTS

| | | | | |
|---|---|---|---|---|
| 4,254,453 | A * | 3/1981 | Mouyard et al. ............... | 362/240 |
| 5,592,578 | A * | 1/1997 | Ruh ................................ | 385/31 |
| 5,897,201 | A * | 4/1999 | Simon .......................... | 362/268 |
| 6,550,953 | B1 * | 4/2003 | Takahashi et al. .............. | 315/56 |
| 2006/0002146 | A1 * | 1/2006 | Baba ............................. | 362/613 |
| 2010/0027257 | A1 * | 2/2010 | Boonekamp et al. .......... | 362/235 |
| 2010/0046217 | A1 * | 2/2010 | Ngai ............................. | 362/235 |
| 2010/0091491 | A1 * | 4/2010 | Jiang et al. .................... | 362/235 |

* cited by examiner

*Primary Examiner* — Jong-Suk (James) Lee
*Assistant Examiner* — Alexander Garlen
(74) *Attorney, Agent, or Firm* — King & Spalding LLP

(57) ABSTRACT

Systems, methods, and devices for reducing glare or pixilation associated with LEDs are disclosed. The disclosure relates to a light module that includes a cover panel that reduces contrast in the light emitted by LEDs. The cover panel can be mounted on a substrate which can include a plurality of LEDs. Apertures in the cover panel are aligned each of the LEDs and any optic that may be disposed over each LED. A first portion of the light emitted from the LEDs passes through the optic only and into the environment to be illuminated. A second portion of the light emitted from the LEDs passes through both the optic and the cover panel before passing into the environment to be illuminated. The cover panel can be diffuse and can include various characteristics including textures, objects, and angled surfaces that assist in scattering light.

18 Claims, 14 Drawing Sheets

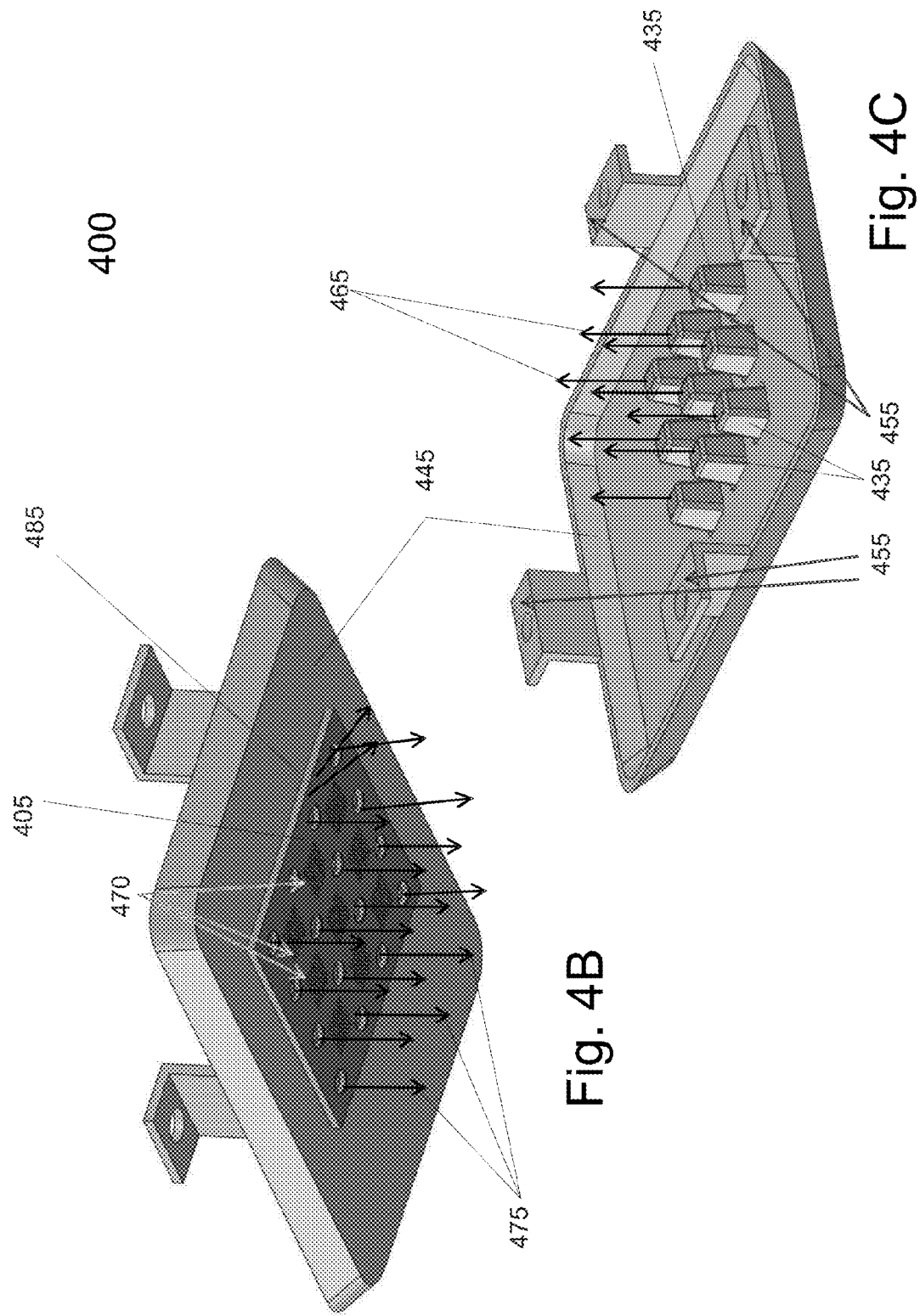

SYSTEMS, METHODS AND DEVICES FOR AN LED LIGHTING MODULE WITH A LIGHT TRANSMISSIVE COVER

RELATED APPLICATIONS

This application claims priority under 35 U.S.C. §119 to U.S. Provisional Patent Application No. 61/509,951, filed Jul. 20, 2011, titled "Systems, Methods And Devices For An LED Lighting Module With Light Transmissive Cover." The foregoing application is hereby incorporated herein in its entirety. This application also incorporates herein by reference in its entirety the disclosures in U.S. patent application Ser. No. 13/462,325 filed May 2, 2012 and U.S. patent application Ser. No. 12/954,074 filed Nov. 24, 2010.

TECHNICAL FIELD

The exemplary embodiments discussed herein relate generally to light emitting diode ("LED") light module construction, and more particularly to systems, methods, and devices for providing an LED lighting module with a light transmissive cover.

BACKGROUND

There are many advantages to the use of light emitting diodes (LEDs) as light sources in light fixtures to produce light efficiently. Many light fixtures have incorporated arrays of LED light sources often configured in a bar-shaped housing or module (also referred to as a "light bar"). While LEDs do produce light in a more efficient manner than previous light sources, one problem is that they are essentially a point source, such that unlike its predecessors, the light emitted by an LED does not spread out very much over a wide area.

Placing optics or diffuse covers alone over the LEDs can help to spread out the light being emitted by the light sources. Unfortunately each of these has its disadvantages. Placing a diffuse cover over the LEDs reduces the amount of overall light being emitted into the environment that is being illuminated. To correct this problem, more LEDs or more powerful LEDs have to be used, thereby increasing power consumption and reducing some of the efficiency gains achieved by using LEDs instead of other light sources.

The use of an optic placed over an LED or group of LEDs can help to spread the light out in the environment that is being illuminated. However, when a person looks up at the light fixture they still see a bunch of different point sources created by the light being emitted by each of the LEDs in the LED array. This problem, often referred to as pixilization, is generated by the significant contrast in the amount of light being generated by the LED when compared to the immediate area around the LED, which is not emitting any light. The high contrast between the portions of the fixture emitting light (the LEDs and lens) and the non-light emitting portions can generate unpleasant glare. Reducing the contrast between the light being emitted by the LEDs and the remaining portion of the light fixture facing the environment to be illuminated would provide an optical system that produces more aesthetically appealing light. Therefore, there is a need to increase the luminous area of the optical system. There is a further need to increase the luminous area of the optical system by using a portion of the light from the LEDs to illuminate the areas of the optical system surrounding the LEDs and lenses.

SUMMARY

In general, in one aspect, the disclosure relates to a light module that includes a cover panel that reduces contrast by reducing pixilation and glare caused by LEDs. The cover panel can be mounted on a substrate which can include a plurality of LEDs. The cover panel can comprise apertures for each of the LEDs and each aperture can accommodate an optic disposed over each LED. The cover panel can be arranged such that a first portion of the light emitted from the LEDs passes through the optic only and into the environment to be illuminated. The cover panel can be further arranged such that a second portion of the light emitted from the LEDs passes through both the optic and the cover panel before passing into the environment to be illuminated. The cover panel can be diffuse and can include various characteristics including textures, objects, and angled surfaces that assist in scattering light.

In another aspect, the disclosure relates to a light module that includes a cover panel that reduces contrast between LEDs and the regions of the light module surrounding the LEDs. The cover panel can be mounted on a substrate which can include a plurality of LEDs. The cover panel can comprise a plurality of light transmissive sections, where a light transmissive section is disposed over an LED and permits light from the LED to pass. The light transmissive sections can further comprise clear sections that permit light to pass through unimpeded and refraction sections that refract light before it is emitted from the light transmissive sections. The cover panel can further comprise a plurality of opaque sections through which light from the light emitting diodes is unable to pass.

In yet another aspect, the disclosure relates to a light module that includes a cover panel that reduces contrast between LEDs and the regions of the light module surrounding the LEDs. The cover panel can be mounted on a substrate which can include a plurality of LEDs. The substrate can further include a plurality of apertures through which passes uplight transmission elements extending from the cover panel. The cover panel can comprise apertures for each of the LEDs and each aperture can accommodate an optic disposed over each LED. The cover panel can be arranged such that a first portion of the light emitted from the LEDs passes through the optic only and into the environment to be illuminated. The cover panel can be further arranged such that a second portion of the light emitted from the LEDs passes through the optic, the cover panel, and the uplight transmission elements before passing into the environment at the topside of the light module. The cover panel can be diffuse and can include various characteristics including textures, objects, and angled surfaces that assist in scattering light.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIGS. 4B and 4C are corresponding bottom and top perspective views of the luminaire system of FIG. 4A, in accordance with an exemplary embodiment of the present disclosure;

Figure 1A:
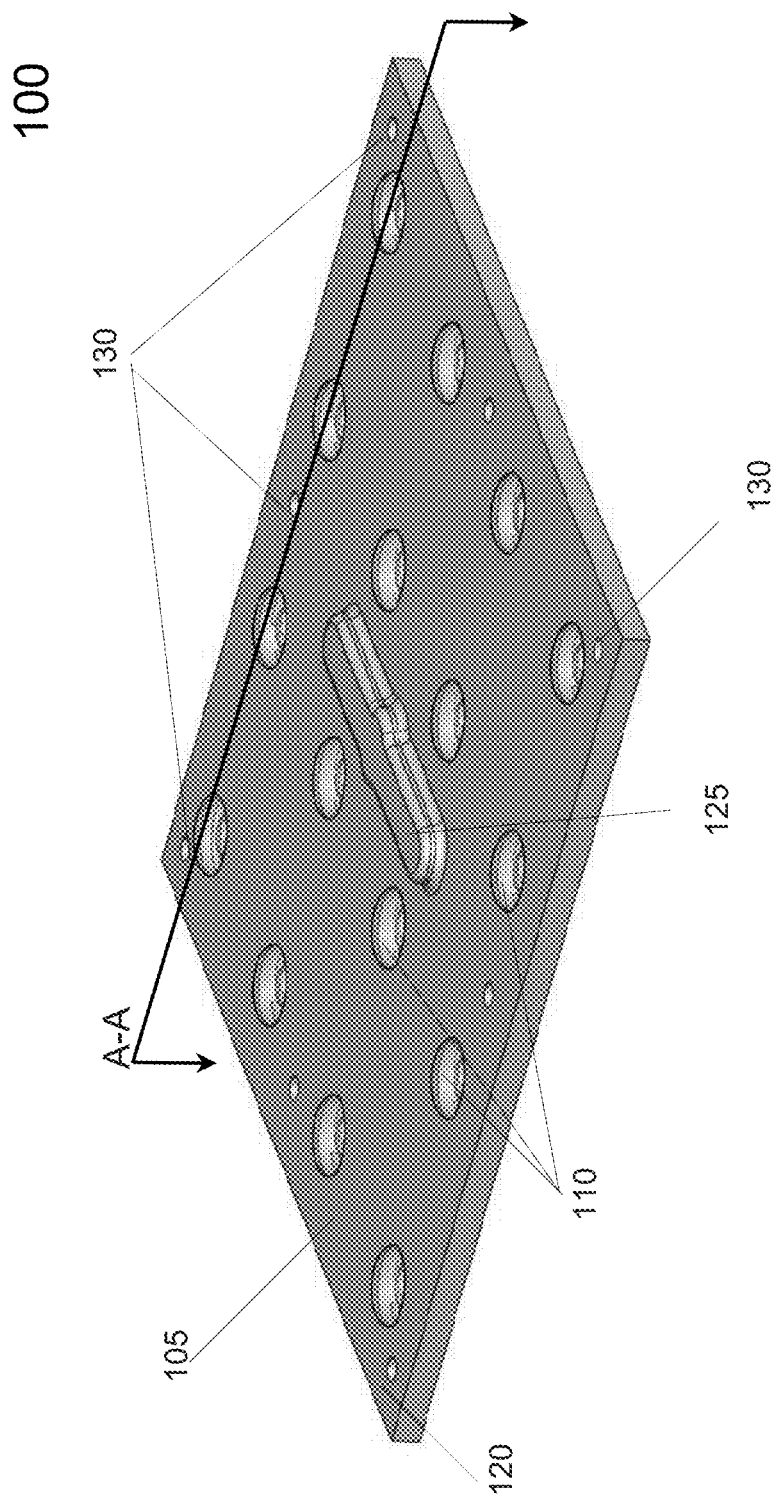
FIG. 1A is a perspective view of an LED light module or light bar with a light transparent cover, in accordance with one exemplary embodiment of the present disclosure.

The drawings illustrate only exemplary embodiments and are therefore not to be considered limiting in scope, as they may admit to other equally effective embodiments. The elements and features shown in the drawings are not necessarily to scale, emphasis instead being placed upon clearly illustrating the principles of the exemplary embodiments. Additionally, certain dimensions or positioning may be exaggerated to help visually convey such principles. In the drawings, reference numerals designate like or corresponding, but not necessarily identical, elements.

DETAILED DESCRIPTION OF THE EXEMPLARY EMBODIMENTS

The exemplary embodiments are directed to an LED light bar or light module (hereinafter referred to simply as a "light module") having a light transmissive cover so that a portion of the light emitted by the LEDs within the light module are emitted through the cover of the light module. Some of these exemplary embodiments also are directed to a lighting system or luminaire that generally emits light downward. The luminaire includes a light module that emits light through the cover of the light module and also provides pathways, such as light pipes that allow for the emission of light upward from the luminaire. According to some exemplary embodiments, a primary lens is disposed over and around one or more LEDs or LED die packages and a secondary lens is disposed over and around one or more primary lens. The term "optic" refers to either the primary lens, the secondary lens, or the combination of the primary lens and the secondary lens.

It should be understood that the embodiments described herein can be applied to the construction of various types of light modules, such as those described in the U.S. patent applications referenced at the beginning of this patent application. It will be understood that the devices taught in the patent applications referenced above could be modified to include any one of the light transmissive covers described herein.

Exemplary embodiments now will be described more fully hereinafter with reference to the accompanying drawings. This disclosure may, however, be embodied in many different forms and should not be construed as limited to the exemplary embodiments set forth herein; rather, these exemplary embodiments are provided so that this disclosure will be thorough and complete, and will fully convey the scope of the disclosure to persons having ordinary skill in the art. Like numbers refer to like, but not necessarily the same, elements throughout.

Figure 1B:
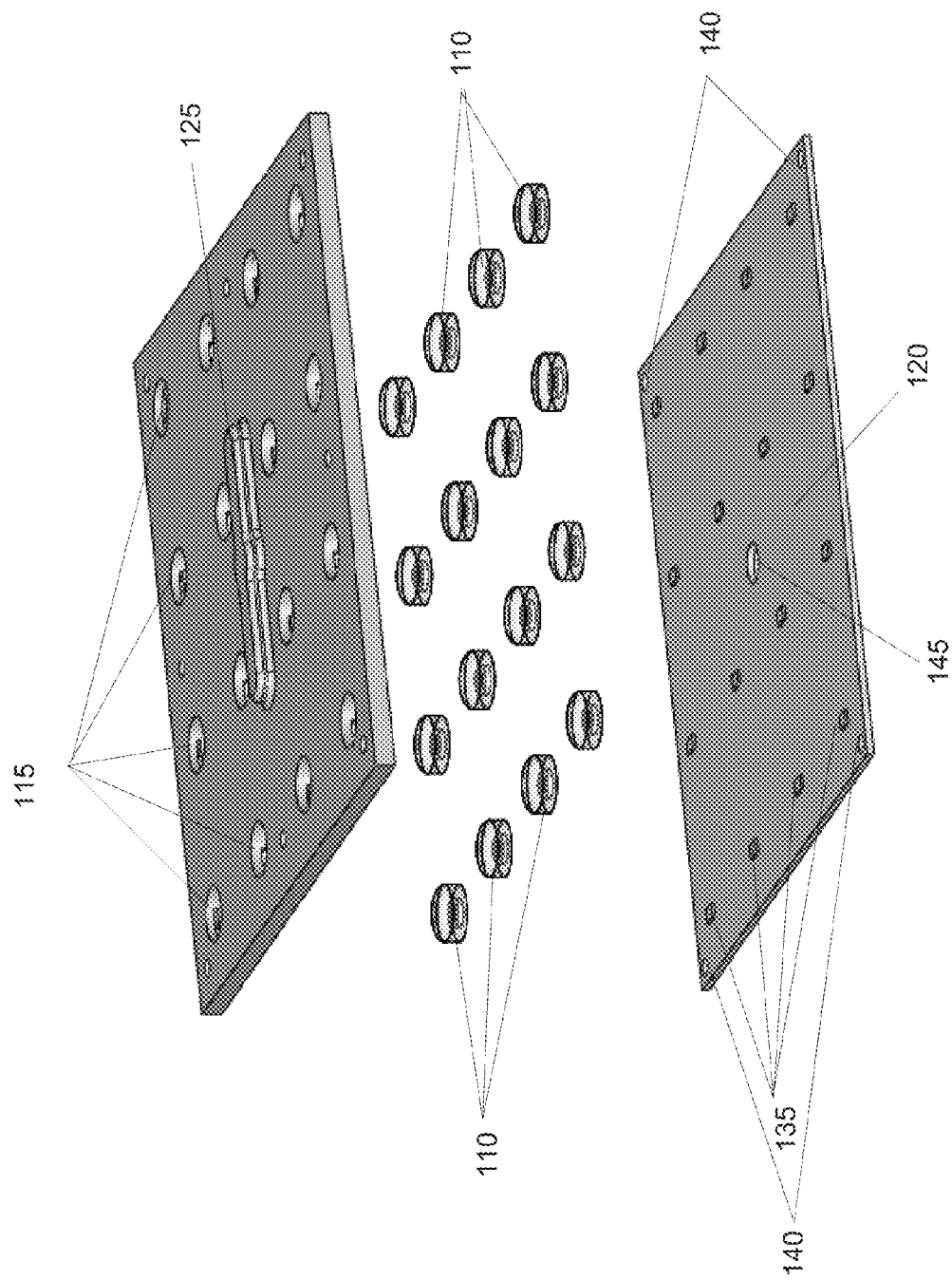
FIG. 1B is an exploded view of the LED light module of FIG. 1A, in accordance with one exemplary embodiment of the present disclosure.
Figure 1C:
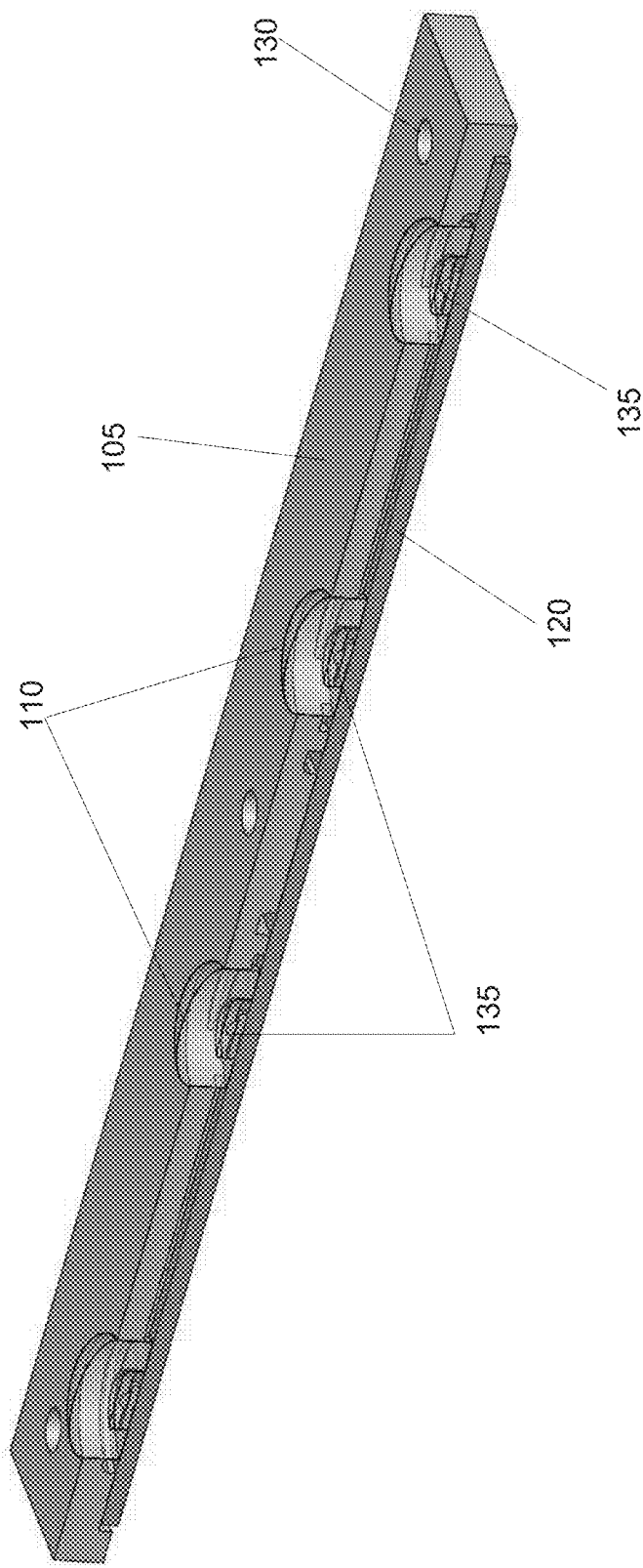
FIG. 1C is a cross-sectional view of the LED light module of FIG. 1A, in accordance with one exemplary embodiment of the present disclosure.
Figure 2:
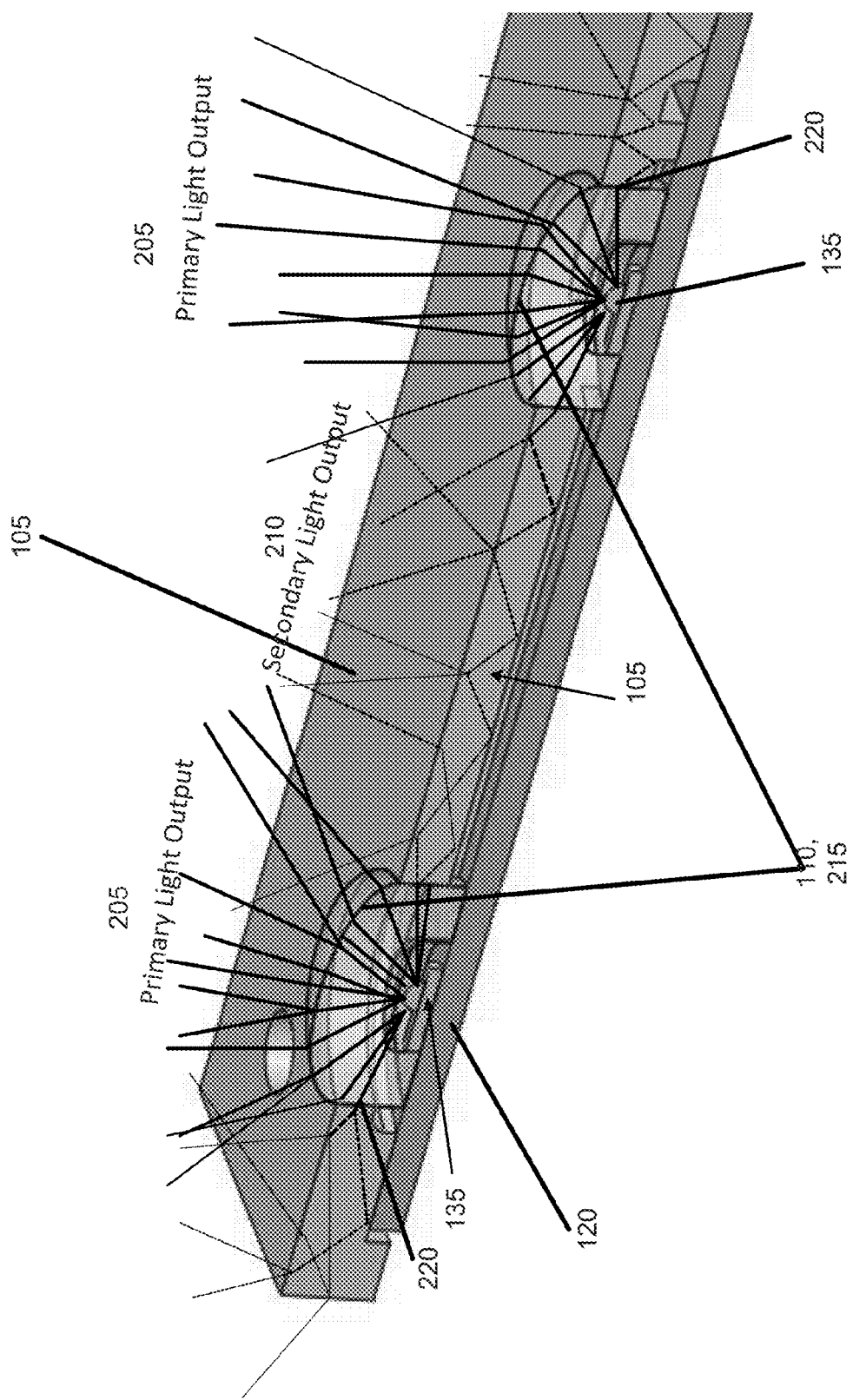
FIG. 2 is another cross-sectional view of the LED light module of FIG. 1A showing representative light paths from the LED die package to the outside environment, in accordance with one exemplary embodiment of the present disclosure.

FIG. 1A is a perspective view of an LED light module 100 in accordance with an exemplary embodiment. FIG. 1B is an exploded view of the LED light module 100 of FIG. 1A. FIG. 1C is a cross-sectional view of the LED light module 100 of FIG. 1A taken along section line A-A. FIG. 2 is a close-up view of the cross-sectional view shown in FIG. 1C. Referring now to FIGS. 1A-C, the exemplary light module 100 includes a light transmissive cover panel 105 and one or more optics 110. The cover panel 105 covers substantially all of at least one side of a common substrate 120. In alternate embodiments, the cover panel can be modified to cover only certain portions of a common substrate. In one exemplary embodiment, the cover panel 105 is capable of allowing light to pass therethrough. The cover panel 105 can be diffuse. In certain exemplary embodiments, the cover panel 105 has a milky white color to emit a substantially white colored light while hiding the view of the common substrate 120 and other material disposed behind the cover panel 105. In another exemplary embodiment, the exterior and/or interior surface of the cover panel 105 is textured to help scatter the light received and allowed to pass through the cover panel 105. In yet another exemplary embodiment, prisms or other light-scattering devices are molded or included in the cover panel to further improve or increase light-scattering capabilities. As further described in connection with FIGS. 6A-6C below, the surfaces of the cover panel 105 can also be modified, for example in angled configurations, to further improve the light-scattering capabilities.

With respect to the construction of the cover panel 105, in certain exemplary embodiments, the cover panel 105 is constructed from a 5VA UL-rated material. In alternative embodiments, the cover panel 105 is constructed from a non-optical grade translucent material. Optional materials for constructing the cover panel 105 include, but are not limited to, acrylic, polycarbonate, glass, and Mylar. However, other metallic and non-metallic materials can be used as well to form the cover panel 105.

Figure 3:
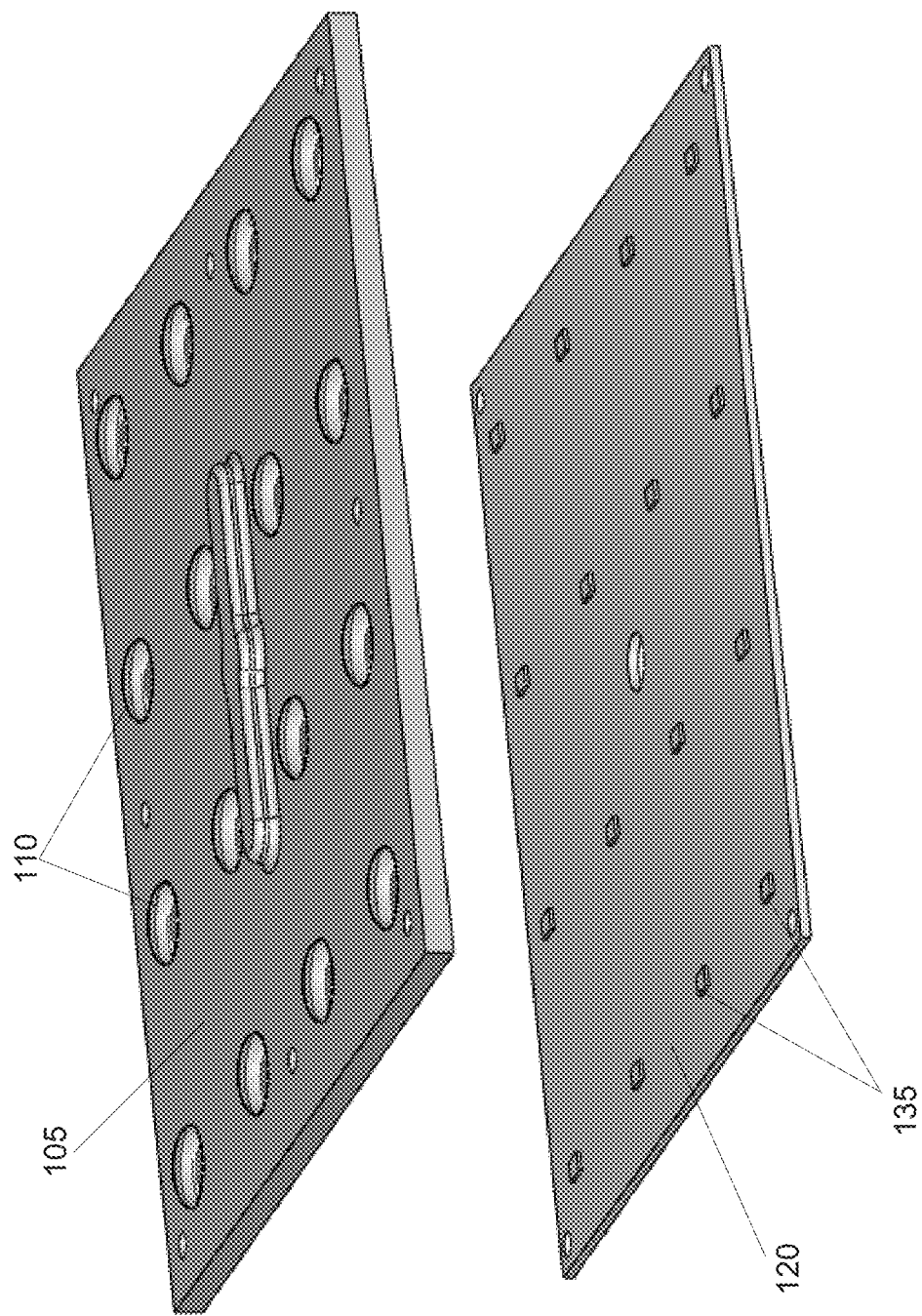
FIG. 3 is an exploded view of another LED light module or light bar, in accordance with another exemplary embodiment of the present disclosure.

In certain exemplary embodiments, the cover panel 105 and the individual optics 110 are molded separately and subsequently placed together when constructing the light module 100. In another exemplary embodiment, such as the embodiment illustrated in FIG. 3, the cover panel 105 and the optics 110 are molded into a single unitary piece in what is called a double-shot mold process. For example, the cover panel 105 can be molded first and then the optics 110 can be directly molded into the desired positions on the cover panel 105. In the double-shot mold process, the optics 110 and the cover panel 105 can be made from the same or different materials.

The cover panel 105 includes multiple optical apertures 115 and a raised area 125. In one exemplary embodiment, the cover panel 105 is square and includes sixteen optical apertures 115 configured to provide an opening for receiving a portion of one of the optics 110 therethrough and for allowing light emitted by one or more LEDs or LED packages on the common substrate 120 to pass therethrough. Those of ordinary skill in the art will recognize that the overall shape of the light module 100 is easily modifiable based on the desires of the manufacturer and that other shapes for the light module 100, including rectangular, trapezoidal, and circular are within the scope and spirit of this exemplary embodiment. Further, the number and positioning of the optical apertures 115 in each cover panel 105 is modifiable based on the specific design requirements of a particular lighting application. For example, while the exemplary embodiments of FIGS.

1A-2 illustrate a square light module having a 4/4 array of LEDs on the PCB, an alternative embodiment can have a rectangular light module having a 1 by, 2 by, or 3 by X array of LEDs on the PCB with a cover panel that is modified to work with the change in shape and size of the PCB and the LED array. The exemplary optical apertures 115 are sized and shaped to allow for a portion of each of the optics 110 to extend through and beyond the top surface of the cover panel 105. In alternate embodiments, the optics 110 may not extend through and beyond the top surface of the cover panel 105.

The raised area 125 is sized and configured to provide room for one or more electrical components (not shown) for driving, controlling, and/or providing electrical power to the LEDs 135 in the light module 100. In addition, the cover panel 105 includes one or more apertures, threaded apertures, or through-holes 130 configured to receive a coupling device, such as a screw, therethrough, for coupling the cover panel 105 to the common substrate 120 and, in certain exemplary embodiments, the light module 100 to a heat sink or other surface.

The common substrate 120 includes one or more LEDs, LED die packages, or chip on board LEDs 135 (collectively referred to herein as LEDs) mounted to the common substrate 120. According to some exemplary embodiments, the common substrate 120 (hereinafter referred to as a "printed circuit board" or "PCB") includes one or more sheets of ceramic, metal, laminate, circuit board, Mylar®, or another material. In one exemplary embodiment, the PCB 120 is a metal core printed circuit board ("MCPCB"). In certain embodiments, the MCPCB 120 is made of aluminum and has a white or substantially white surface. The white surface increases the amount of light reflected off of the surface of the MCPCB 120. In alternative exemplary embodiments, the PCB 120 has a green or other non-white color surface and includes a silk-screened layer of white or other highly reflective material (for example, silver) that is affixed or adhered to the top surface of the PCB 120 to increase the amount of light reflected off of the top side of the PCB 120.

The exemplary PCB 120 also includes several apertures, threaded apertures, or through-holes 140 configured to receive the coupling device discussed above with reference to element 130 for coupling the light transmissive cover 105 to the PCB 120 and/or light module 100 to a heat sink or other surface. According to one exemplary embodiment, the apertures 140 lie around the perimeter of the PCB 120 and are aligned with the apertures 130. However, these apertures 140 can lie in a different pattern in other exemplary embodiments. The PCB 120 also includes an aperture 145 configured to receive wires (not shown) to electrically couple the PCB 120, at contacts disposed on the PCB 120, to an LED driver or other power source. In certain exemplary embodiments, the wires are coupled to the contacts with solder or other known coupling means. While the exemplary aperture 145 is presented in the middle of the PCB 120, alternatively it could be placed along any other portion of the PCB or the contacts could be placed along an edge of the light module 100 and the wires could be coupled to the contacts along the edge eliminating the need for the aperture 145. The PCB 120 provides a convenient means to provide power to the LEDs 135 and is known to people having ordinary skill in the art. However, other means for conveying power to the LEDs 135 also are contemplated herein, for example, connectors, sockets, plugs, direct wiring, and other means known to people having ordinary skill in the art.

Each LED 135 includes at least one chip of semi-conductive material that is treated to create a positive-negative ("p-n") junction. When the LED 135 is electrically coupled to a power source, such as a driver (not shown) by way of the wires and contacts on the PCB 120, current flows from the positive side to the negative side of each junction, causing charge carriers to release energy in the form of incoherent light. In the exemplary embodiment of FIG. 1B, the LEDs 135 are disposed along the substrate 120 in an array having sixteen total LEDs 135 in a 4×4 configuration.

In certain alternative embodiments, instead of having the apertures 130 and 140 and a coupling means, such as a screw, for coupling the cover panel 105 to the PCB 120, one or more adhesive strips are disposed between the surface of the PC board 120 and the cover panel 105 such as the system for coupling a light bar discussed in the patent applications referenced in the beginning of this application, which are incorporated herein by reference. A bottom surface of the adhesive layer adheres to the surface of the PCB 120, while at least a portion of a top surface of the adhesive layer adheres to a bottom surface of the cover panel 105.

One example of the adhesive strip is a high performance, double-sided tape. Alternatively, a viscous or semi-viscous adhesive is applied to the top side of the PCB 120 instead of using double-sided tape for the adhesive strips. In constructing the light module 100, the cover panel 105 is pressed down over the PCB 120 and the optics 110 and the adhesive or adhesive strips adhere to the bottom side of the cover panel 105 to hold the cover panel 105 in place over at least the top side of the PCB 120. In certain exemplary embodiments the adhesive strips can be made of any acrylic-based adhesive including, but not limited to, FLEXMOUNT L606 manufactured by FLEXCON or VHB tape manufactured by 3M.

Referring to the exemplary embodiment shown in FIGS. 1C and 2, the optics 110 are disposed over the LEDs 135. Each optic 110 receives the light emitted from a respective LED 135 and distributes the light to a desired illumination area. For example, a portion of the light emitted by each LED 135 passes through a top side 215 of the respective optic 110 as primary light 205 and into the environment to be illuminated. A second portion of the light emitted by each LED 135 passes through a side wall 220 of the respective optic 110. In certain light modules, this second portion of the light would typically be lost as it bounces around the interior of the light module. However, with the light transmissive cover panel 105 of the embodiments described herein, a portion of the second portion of the light escapes and is emitted through the cover panel 105.

As seen in the exemplary embodiment shown in FIG. 2, the second portion can emit some light though the cover panel 105 in the form of secondary light 210 while reflecting another portion back towards the PCB 120. That light can then reflect off of the PCB 120 and back towards the cover panel 105 to emit additional secondary light 210 out along another portion of the cover panel 105. In one exemplary embodiment, the secondary light 210 has a lower intensity than the primary light 205 that is output through the top side 215 of the optic 110. The lower intensity secondary light 210 serves to reduce the contrast between the light emitted by the LEDs 135 and the areas of the light module 100 surrounding the LEDs 135. As discussed above, the cover panel 105 can be diffuse and capable of scattering light, such as between the top and bottom surfaces of the cover panel to cause the cover panel to glow. In addition, the PCB 120 can be an MCPCB with a white outer exterior or a PCB with a white silkscreen on the top side to increase the efficiency of light being reflected by the PCB 120. In certain exemplary embodiments, the light between the PCB 120 and the cover panel 105 that contacts the cover panel 105 at a high angle will typically exit the cover panel 105 as secondary light 210 while light that contacts the cover panel 105 at a low angle will typically reflect off of the cover panel 105 back toward the PCB 120.

The optic 110 can be disposed over either a single LED 135, multiple LEDs, or LED chip on board LEDs. According to certain exemplary embodiments, the optic 110 is designed to receive light from the LED 135 that the optic 110 is disposed over and direct light to the desired illumination area in a predetermined manner, which includes one or more of direction, pattern, and intensity. Each optic 110 used in the light module 100 is designed the same according to some exemplary embodiments, while one or more optics 110 are designed differently than another optic 110 used in the same light module 100 in accordance with other exemplary embodiments. The exemplary optic 110 is typically fabricated using an optical grade acrylic or polycarbonate material; however, the optic 110 can be fabricated using other transparent or translucent materials, such as glass. In certain exemplary embodiments, the optics 110 can be configured to provide Type I, II, III, IV, or V distribution, as that term is understood by those or ordinary skill in the art.

Figure 4A:
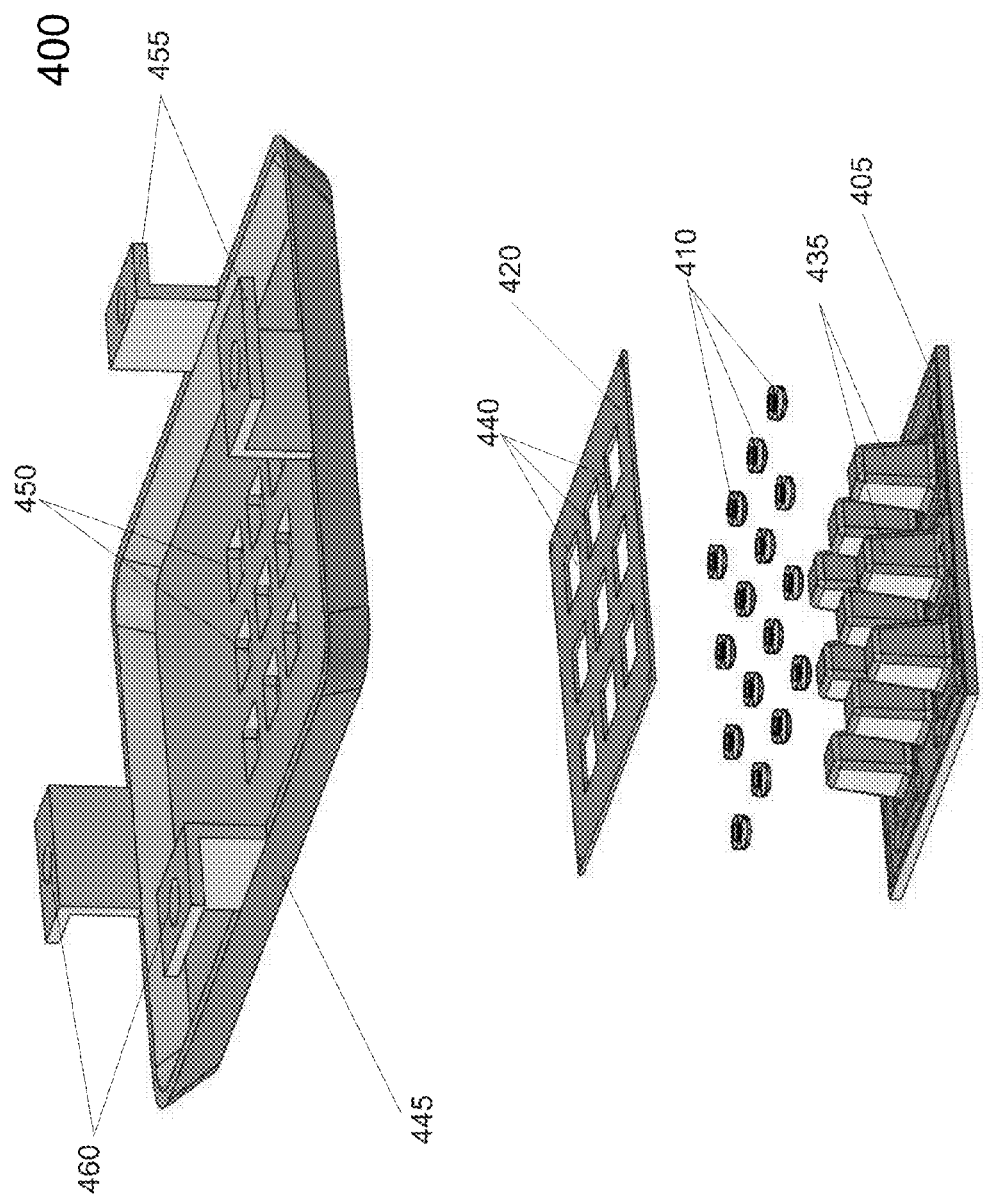
FIG. 4A is an exploded view of a luminaire with an alternative LED light module or light bar, in accordance with an alternative exemplary embodiment of the present disclosure.

FIG. 4A is an exploded view of a luminaire system 400 with an alternative LED light module, in accordance with an exemplary embodiment. FIGS. 4B and 4C are bottom and top assembly views of the luminaire system 400. Referring now to FIGS. 4A-C, the exemplary luminaire system 400 provides one example of a combination uplight and downlight system using a light transmissive cover panel 405. The luminaire system includes a light module that includes a common substrate 420, multiple optics 410, and the light transmissive cover panel 405.

The light transmissive cover panel 405 can be made of similar materials as that described with reference to FIGS. 1A-2. The cover panel 405 includes uplight transmission elements 435. In one exemplary embodiment, the uplight transmission elements 435 are light pipes made of the same material as the remainder of the cover panel. Alternatively, the light pipes 435 can be clear instead of diffuse, so that more light is passed through the light pipes and emitted upward from the luminaire. In the exemplary embodiment of FIG. 4A, the light pipes 435 have the shape of a frustum of a pyramid; however, many other shapes, including cylindrical and rectangular shapes, can be used instead and are within the scope and spirit of this disclosure. In certain exemplary embodiments, on the bottom side of the cover panel 405 below each uplight transmission element 435 is a prismatic or reflective surface 470 that takes the light emitted, for example, out of the side wall of the optic 410, allows some of that light to escape through the surface of the cover panel 405 at the prismatic reflector and directs another portion of the light up through the uplight transmission element 435. While the exemplary embodiment of FIGS. 4A-C illustrates the uplight transmission elements 435 as being interspersed along the interior area of the light module, other configurations could be employed including, but not limited to, positioning the uplight transmission elements along the perimeter of the light module.

Similar to the cover panel 105, the cover panel 405 includes multiple apertures (not shown) for receiving a portion of one or more of the optics 410. The cover panel 405 can be coupled to the exemplary PCB 420 in a manner similar to that described with regard to FIGS. 1A-2. The PCB 420 also includes LEDs similar to those described above with regard to FIGS. 1A-2. In the embodiment illustrated in FIG. 4A, the LEDs are not visible because they are on the underside of the PCB 420. The exemplary PCB 420 includes multiple apertures 440. In one exemplary embodiment, each aperture 440 is sized and shaped to receive a portion of the uplight transmission element 435 therethrough.

The assembled light module can then be coupled to a luminaire housing 445 using known attachment methods, such as screws, rivets, or magnets. In one exemplary embodiment, the housing 445 is configured to provide both uplight and downlight that is emitted by the exemplary light module. The housing 445 includes multiple apertures 450 disposed on a planar or substantially planar surface. Each aperture is sized and shaped to received at least a portion of each uplight transmission element 435 of the cover panel 405 therethrough. The housing also includes one or more mounting brackets 455. Each mounting bracket is configured to provide sufficient space between the planar surface of the housing 445 and a wall or ceiling so that the uplight generated by the light module has sufficient area to escape and illuminate a desired area on the wall or ceiling surface. In certain exemplary embodiments, each mounting bracket 455 includes an aperture, such as a threaded aperture or through-hole, that is used in conjunction with an attachment mechanism, such as a screw or bolt, to attach the housing 445 to a wall or ceiling surface.

As best seen in FIGS. 4B and 4C, when power is provided to the LEDs in the light module, a first portion 475 of the light is emitted in a generally downward direction passing from the LED through only the optic 410 and into the environment. Similar to the description associated with FIGS. 1A-2 above, a second portion 485 of the light emitted by the LEDs passes through the wall of the optic 410, into the cover panel 405, and then is emitted in a downward direction from the cover panel 405 reducing the contrast with the light emitted from the LEDs. A third portion 465 of the light emitted by the LEDs passes through the wall of the optic 410 into the cover panel 405 and is emitted upward through the uplight transmission elements 435 and out of the top side of the housing 445. In certain embodiments, the third portion 465 of the light can be reflected off reflective surface 470 in order to be directed upward through the uplight transmission elements 435. By further illuminating the environment, the third portion 465 of the light reflected off a ceiling or wall can further improve the performance of the luminaire and assist in reducing the pixilation and glare caused by LED light sources.

Figure 5A:
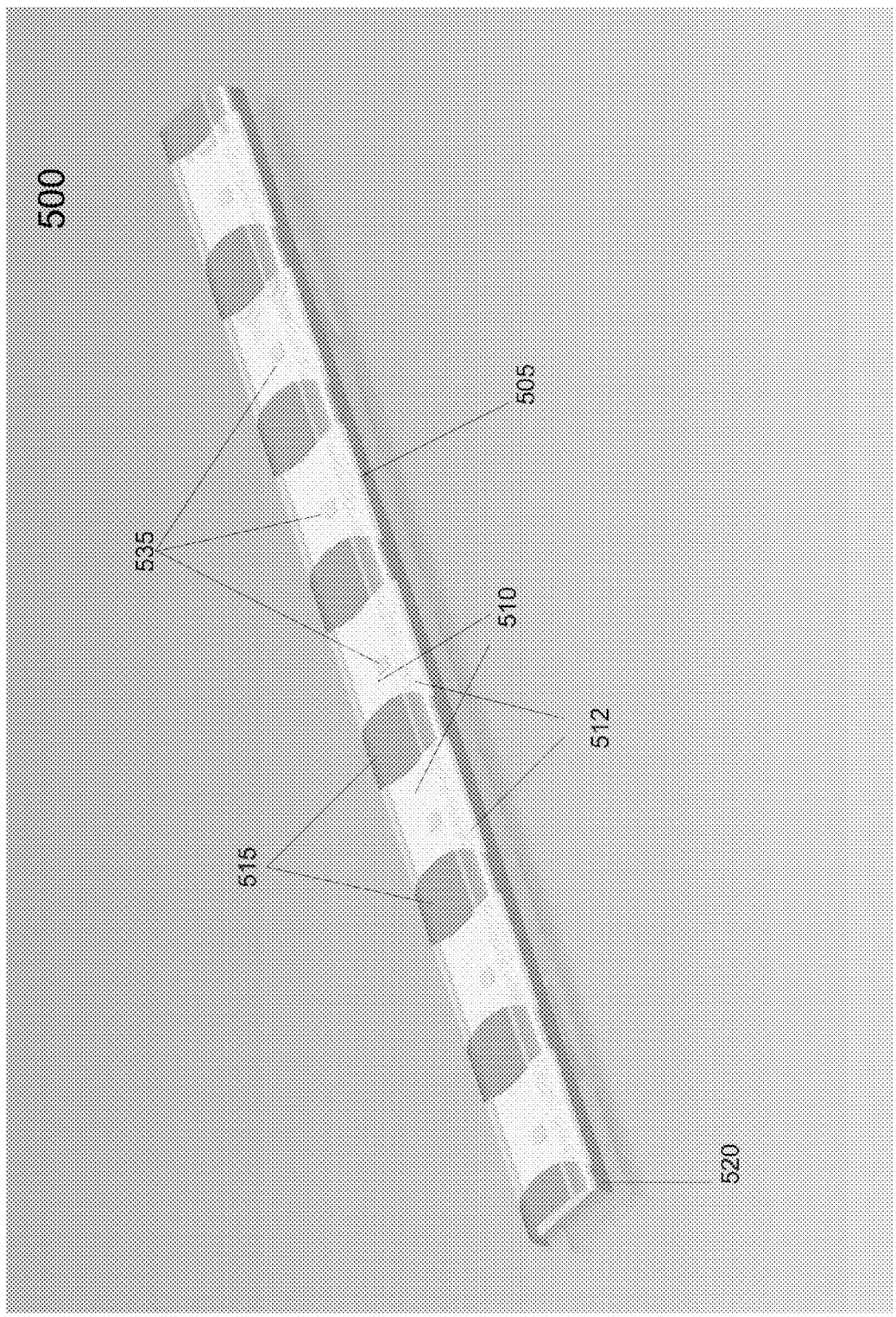
FIGS. 5A-C are perspective views of another LED light module, in accordance with another alternative embodiment of the present disclosure.
Figure 5B:
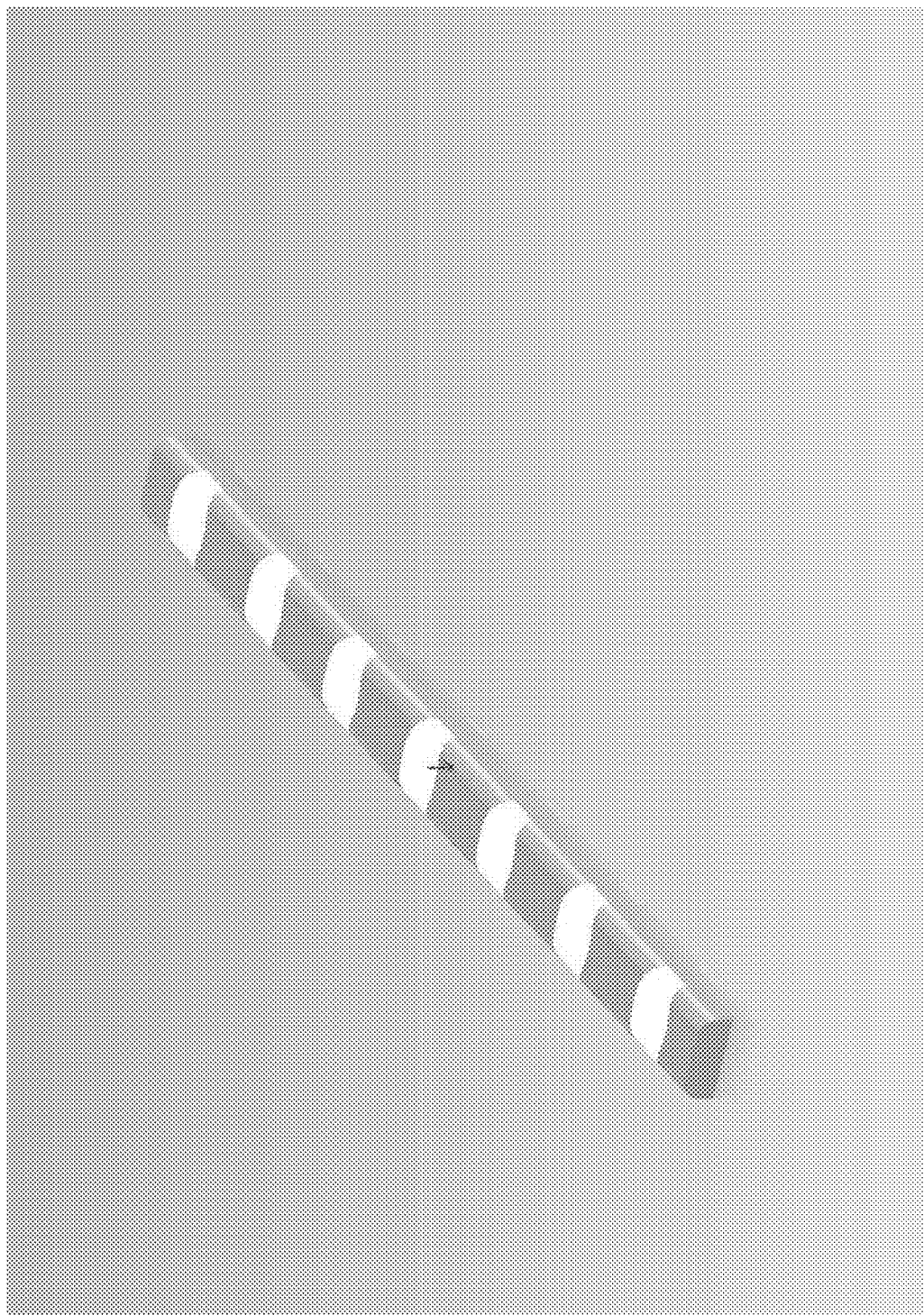
Figure 5C:
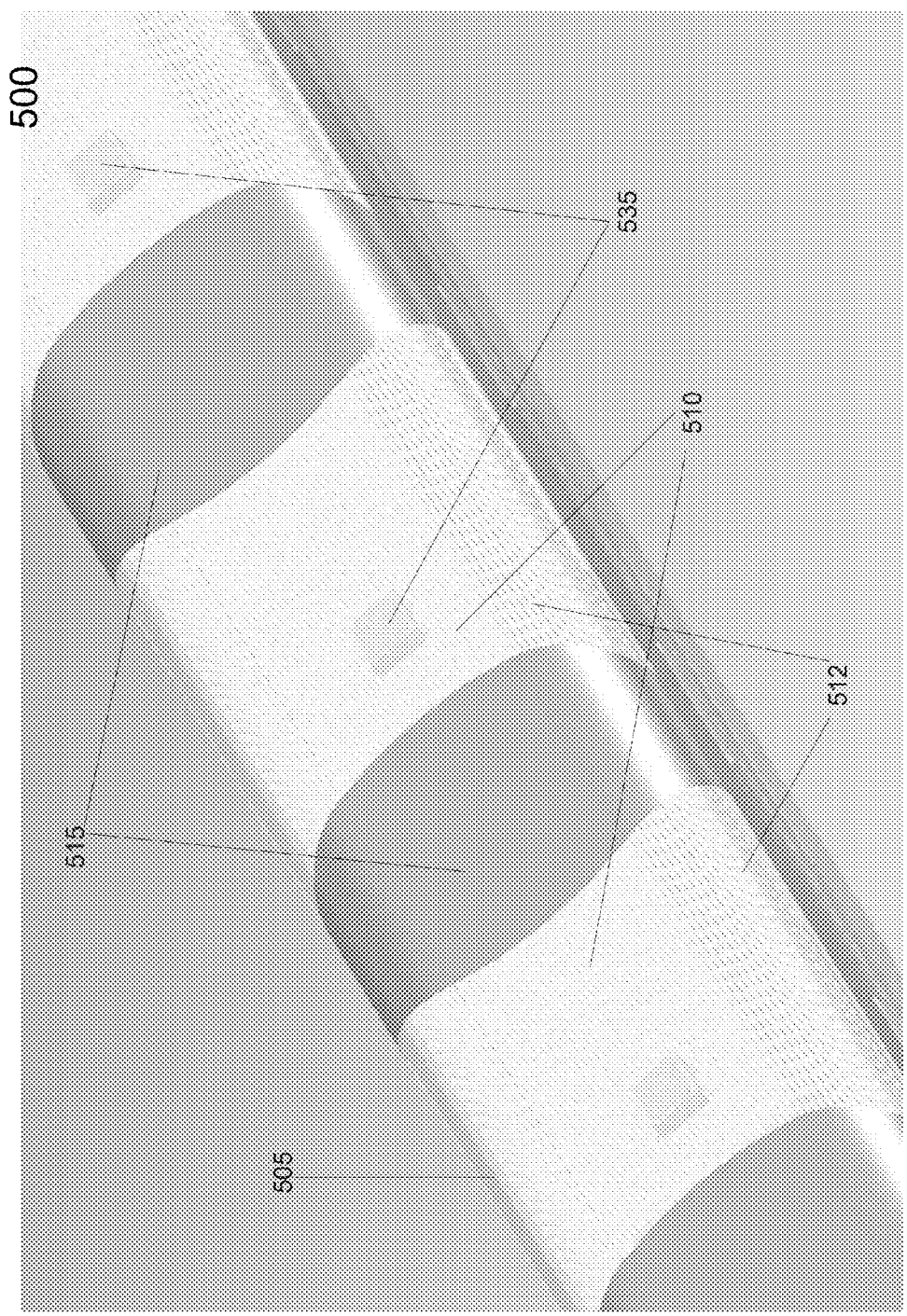

FIGS. 5A-C are perspective views of an alternative LED light module 500 in accordance with another exemplary embodiment. Now referring to FIGS. 5A-C, the exemplary light module 500 includes a PCB or common substrate 520 with an array of LEDs 535 disposed on the PCB 520. While the exemplary embodiment shown presents the LED array in a 1×7 configuration, other array configurations and sizes and shapes of both the PCB 520 and the array of LEDs 535 are within the scope and spirit of this disclosure.

A cover panel 505 is coupled to the PCB 520 and positioned over the LEDs 535. In one exemplary embodiment, the cover panel 505 is an acrylic lens; however, other known materials, such as glass or polycarbonate may be used. The cover panel 505 includes a light transmissive section and an opaque section 515. The light transmissive section can comprise an optic lens section 510 and a partially obstructed section 512. The optic lens section 510 can be disposed generally above the LED 535 and emit a primary portion of the light similar to that described in connection with FIGS. 1A-2. The partially obstructed section 512 can comprise one or more of a variety of obstructions including textured portions, light scattering objects and coatings. The obstructions of partially obstructed section 512 scatter light from the LEDs 535 and the scattered light is emitted from the light module 500 as a secondary light. Similar to the description associated with FIGS. 1A-2, the secondary light emitted from partially obstructed sections 512 can assist in reducing the contrast of the light being emitted from the light module 500. In alternate embodiments, the partially obstructed sections 512 can comprise angled surfaces that can also facilitate the emission of secondary light from the light module 500.

In the embodiment shown in FIGS. 5A-5C, between each light transmissive section is an opaque section 515 of the cover panel 505. In the illustrated embodiments, the opaque sections 515 are generated by texturing or frosting the portions of the cover panel 505 so that light is not emitted from these opaque sections 515. The opaque sections 515 can further improve the performance of the light module 500 by reducing the interaction between the light beams emitted from each LED 535. Reducing the interaction between the light beams from each LED 535 can further reduce contrast and improve the overall appearance of the light emitted from the light module 500.

Figure 6A:
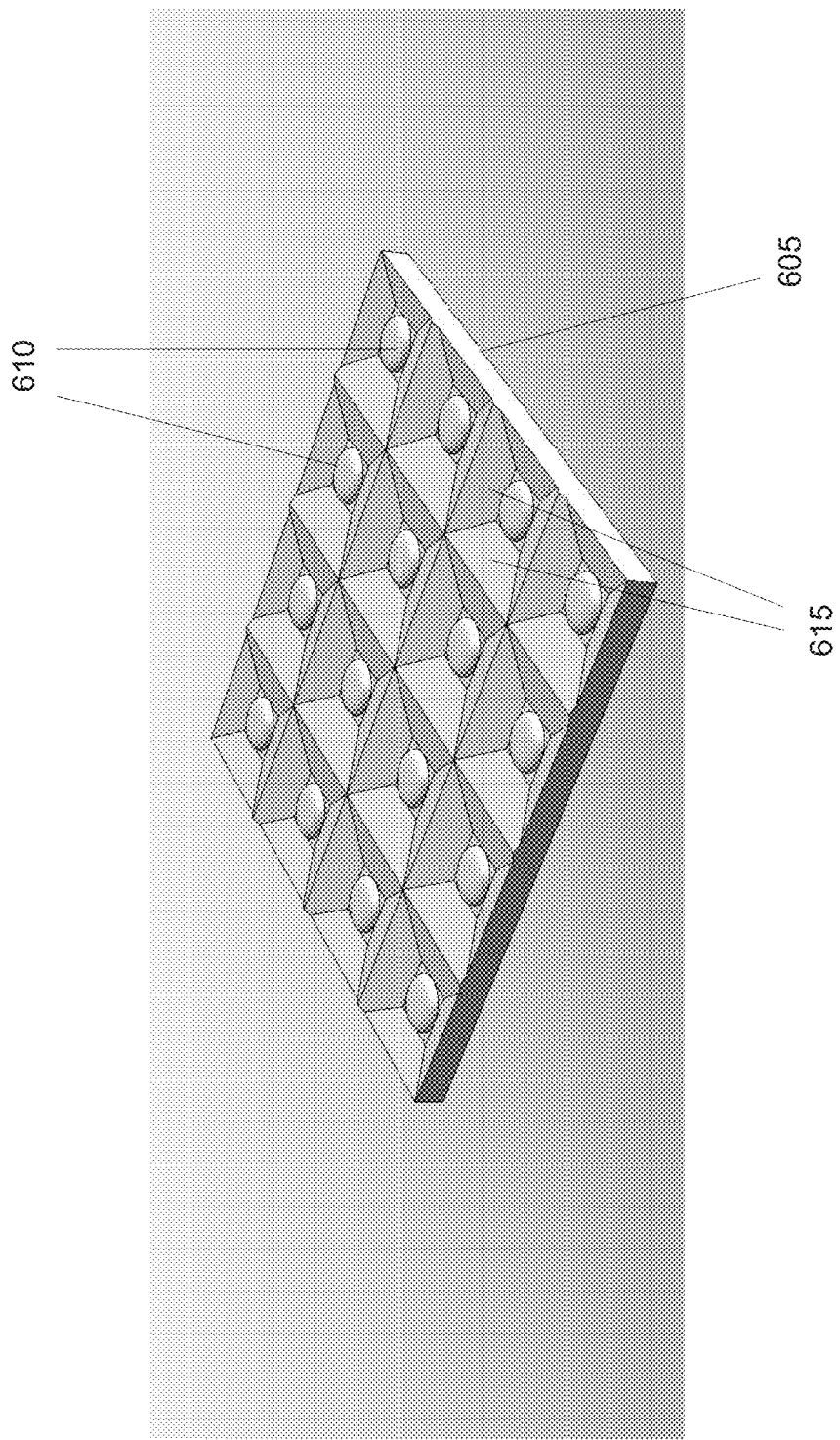
FIGS. 6A-C are perspective views of additional LED light modules in accordance with additional alternate embodiments of the present disclosure.
Figure 6B:
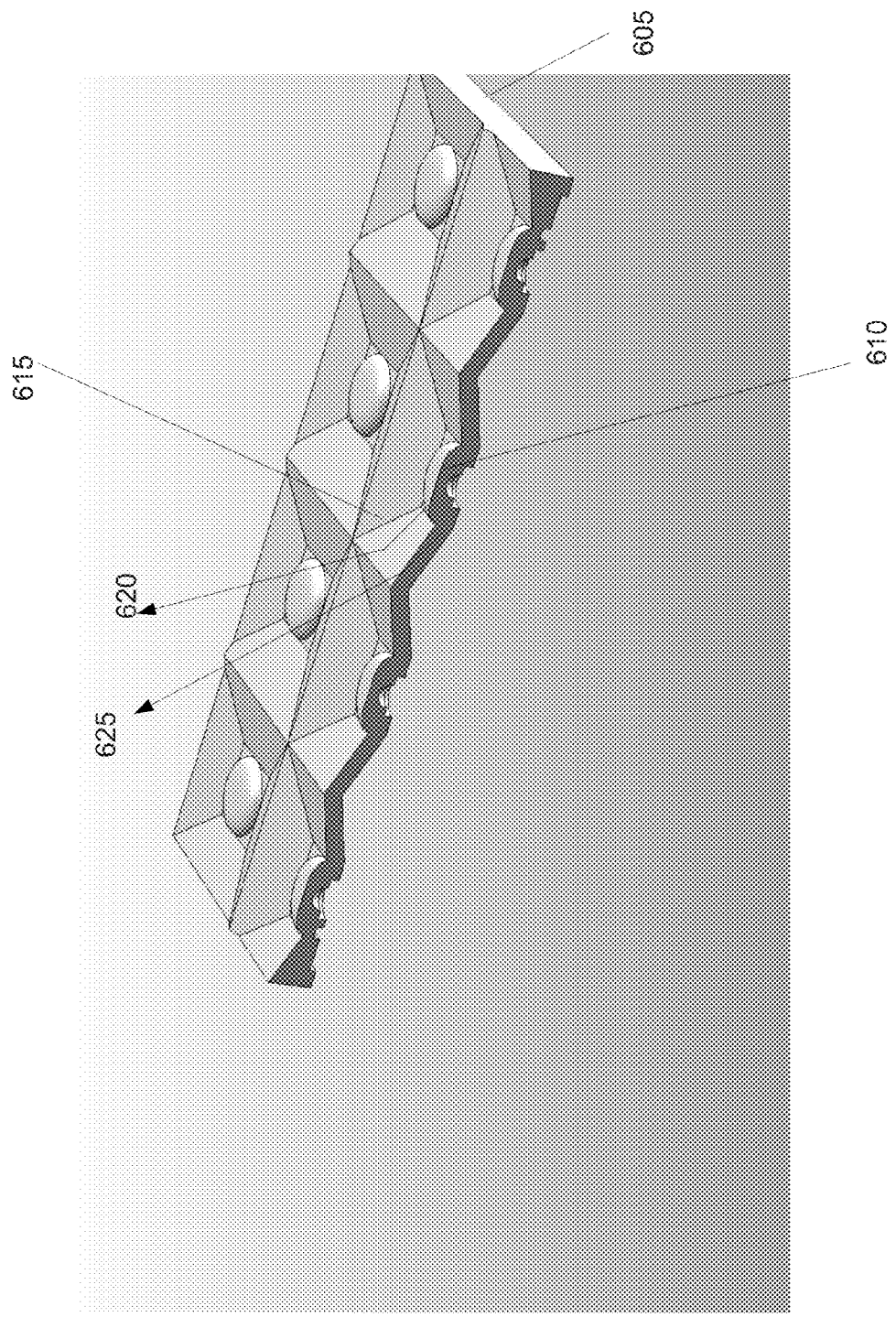
Figure 6C:
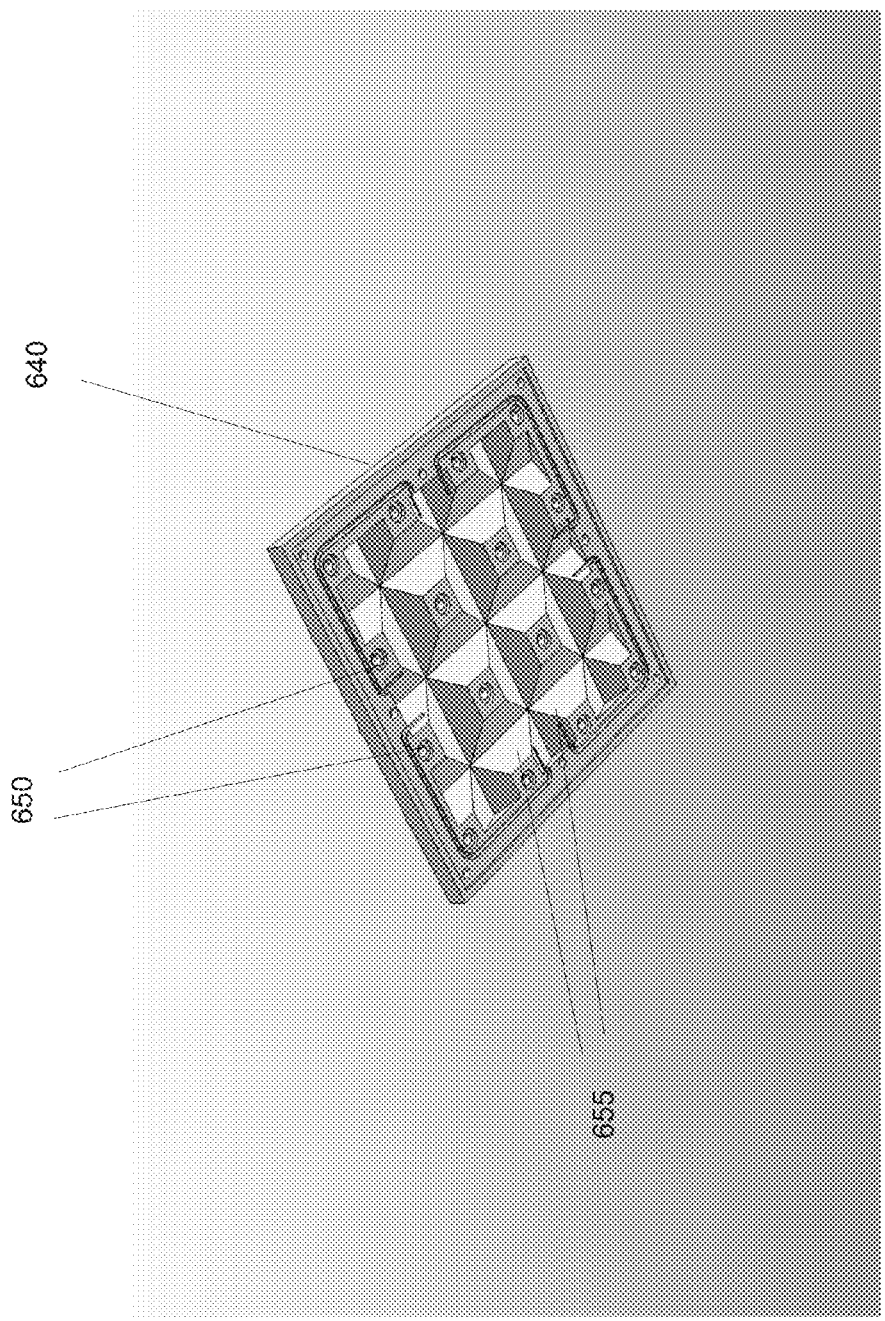

Referring now to FIGS. 6A-6C, alternate embodiments of the light modules described herein are shown. In general, the alternate embodiments shown in FIGS. 6A-6C illustrate cover panels that have angled surfaces to further enhance the secondary light emitted from the cover panels. Referring to the embodiment illustrated in FIG. 6A, a cover panel 605 is shown. While not shown in FIG. 6A, cover panel 605 is designed to be mounted on a substrate such as a PCB containing LEDs. Cover panel 605 includes optics 610 which would be disposed over LEDs when the cover panel 605 is mounted to a PCB. The top surface of exemplary cover panel 605 also includes a plurality of angled surfaces 615.

As shown more clearly in the cross-sectional view of FIG. 6B, the angled surfaces 615 can receive light emitted at wide angles from the optic 610 and reflect that light 620. The additional light 620 reflected from angled surfaces 615 enhances the secondary light 625 that passes through the wall of the optic 610 and is emitted from the cover panel 605 as described in connection with FIGS. 1A-2.

FIG. 6C illustrates another embodiment of a cover panel 640. While not shown in FIG. 6C, the exemplary cover panel 640 also is designed to be coupled to a substrate containing LEDs. The geometry of cover panel 640 is somewhat different from that of cover panel 605 shown in FIGS. 6A and 6B. Nonetheless, cover panel 640 of FIG. 6C comprises optics 650 and reflective surfaces 655. Similar to the cover panel 605 of FIGS. 6A and 6B, cover panel 640 uses reflective surfaces 655 to reflect wide angle light emitted from the optics 650 to further enhance the secondary light emitted from cover panel 640.

Figure 7:
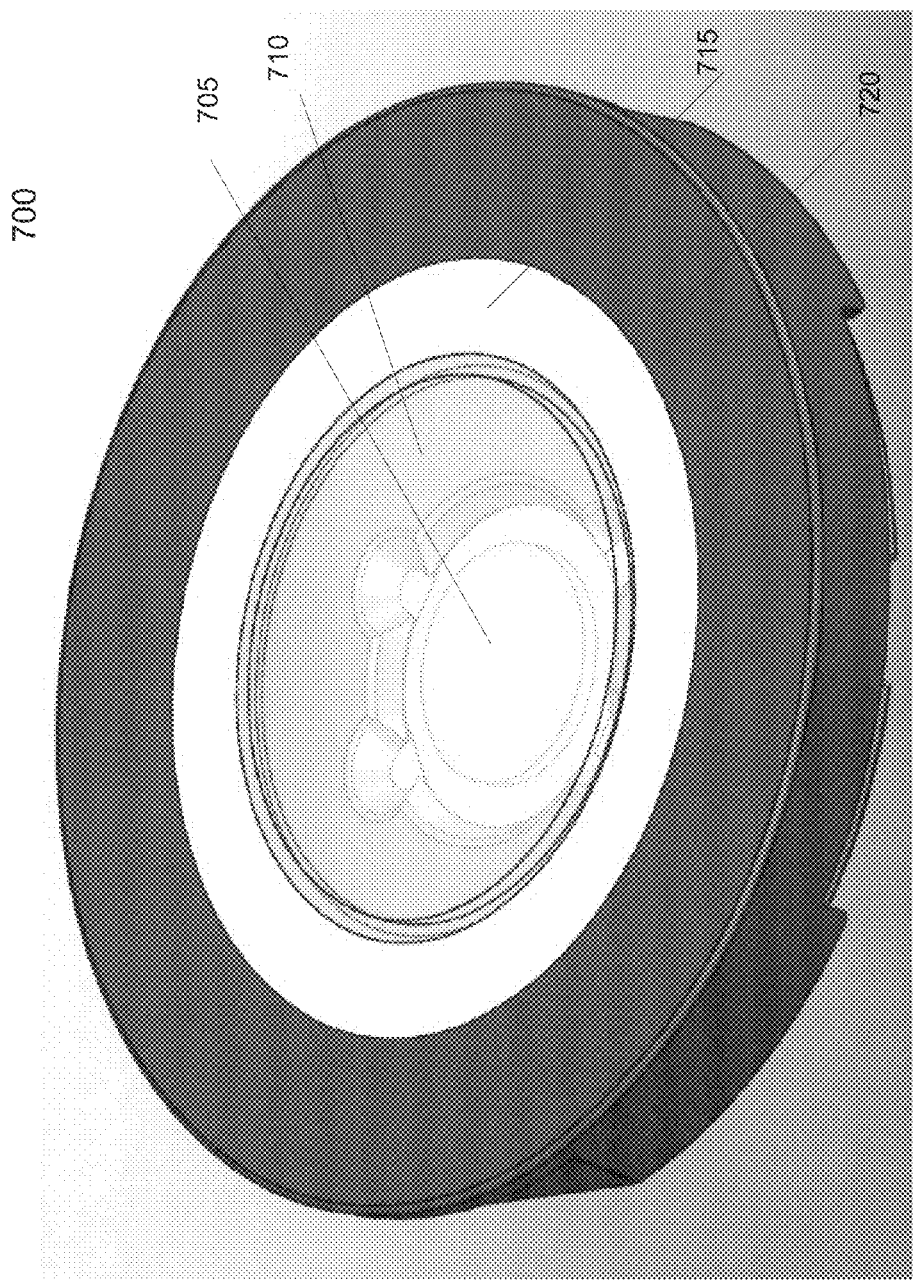
FIG. 7 is a perspective view of another LED light module, in accordance with another alternative embodiment of the present disclosure.

Referring now to FIG. 7, another embodiment is illustrated in the form of light module 700. Light module 700 comprises a single LED 705 mounted on a substrate or printed circuit board. A transparent optic 710 is disposed over the LED 705. The transparent optic 710 is surrounded by circular cover panel 715. The circular cover panel 715 is surrounded by opaque member 720. In operation, a primary portion of the light emitted from the LED 705 passes through the transparent optic 710 and directly into the environment to be illuminated. A secondary portion of the light emitted from the LED 705 passes through the transparent optic 710 and through the circular cover panel 715. The circular cover panel 715 can comprise one or more of textures, coatings, and light scattering objects that distort the secondary portion of the light before it is emitted into the environment to be illuminated. The combination of the primary portion and secondary portion of the light assists in reducing contrast and improving the performance of the light module 700.

In the embodiment shown in FIG. 7, the opaque member 720 does not emit light. However, in alternate embodiments the opaque member 720 can be replaced by a member similar to circular cover panel 715 that emits a secondary portion of light.

The embodiments described herein are illustrative and not restrictive. It should be appreciated by those skilled in the art that various modifications are well within the scope of the invention. From the foregoing, it will be appreciated that the embodiments overcome limitations in the prior art. From the description of the exemplary embodiments, equivalents of the elements shown therein will suggest themselves to those skilled in the art, and ways of constructing other embodiments will suggest themselves to practitioners of the art. Therefore, the scope of the disclosure is not limited to the examples provided herein.

We claim:

1. A light module comprising:
   a substrate;
   a plurality of light-emitting diodes (LEDs) coupled to the substrate;
   a plurality of optics, each optic disposed over at least one of the plurality of LEDs; and
   a cover panel disposed over the substrate and comprising:
      a light transmissive portion, wherein the light transmissive portion of the cover panel comprises a raised area adapted to house an electrical component coupled to the LEDs, and
      a plurality of apertures through the cover panel, each aperture configured to receive a portion of one of the optics therethrough,
   wherein a first portion of the light emitted by the LEDs passes through the optic only before passing into an environment to be illuminated, and
   wherein a second portion of the light emitted by the LEDs passes through the optic and the light transmissive portion of the cover panel before passing into the environment to be illuminated.

2. The light module of claim 1, wherein the substrate is one of a printed circuit board and a metal core printed circuit board.

3. The light module of claim 1, wherein the cover panel comprises a plurality of reflective angled surfaces on one side of the cover panel.

4. The light module of claim 1, wherein the cover panel comprises light scattering features in the light transmissive portion.

5. The light module of claim 1, wherein the light module further comprises at least one adhesive strip disposed between the substrate and the cover panel to couple the cover panel to the substrate.

6. The light module of claim 1, wherein the portion of the cover panel facing the area to be illuminated is light transmissive.

7. The light module of claim 1, wherein the cover panel is constructed with a material that achieves a 5VA rating from Underwriters Laboratories.

8. The light module of claim 1, wherein the light transmissive portion of the cover panel refracts the second portion of light received from the LEDs.

9. The light module of claim 1, wherein the substrate comprises a reflective layer disposed on a top side of the substrate and wherein the LEDs are coupled to the top side of the substrate.

10. The light module of claim 9, wherein the reflective layer is integrally formed with the substrate.

11. A light module comprising:
a substrate;
a plurality of light-emitting diodes (LEDs) electrically coupled to the substrate; and
a cover panel disposed over the substrate and LEDs, the cover panel comprising:
 a plurality of light transmissive sections, each light transmissive section comprising:
  an optic disposed over one of the plurality of LEDs, and
  a partially obstructed portion surrounding the optic, and
 wherein a first portion of the light emitted by the LEDs is emitted through the optics of the plurality of light transmissive sections,
 wherein a second portion of the light emitted by the LEDs is emitted through the partially obstructed portions of the plurality of light transmissive sections, and
 wherein one of the plurality of light transmissive sections comprises a raised area adapted to house an electrical component associated with the LEDs.

12. The light module of claim 11, wherein the cover panel comprises a plurality of reflective angled surfaces on one side of the cover panel.

13. The light module of claim 11, wherein the partially obstructed portions of the plurality of light transmissive sections comprise light scattering features.

14. A light module comprising:
a substrate comprising a plurality of substrate apertures;
a plurality of light-emitting diodes (LEDs) coupled to the substrate;
a plurality of optics, each optic disposed over at least one of the plurality of LEDs; and
a cover panel disposed over the substrate and comprising:
 a light transmissive portion,
 a plurality of uplight transmission elements disposed in the plurality of substrate apertures, wherein a bottom side of the cover panel below each uplight transmission element comprises a prismatic or reflective surface, and
 a plurality of cover panel apertures through the cover panel, each aperture configured to receive a portion of one of the plurality of optics therethrough,
 wherein a first portion of the light emitted by the LEDs passes only through the optic before it is emitted downwards into an environment through the bottom side of the cover panel to be illuminated,
 wherein a second portion of the light emitted by the LEDs passes through the optic into the light transmissive portion of the cover panel and is emitted downwards into the environment through the bottom side of the cover panel, and
 wherein a third portion of the light emitted by the LEDs passes through the optic into the light transmissive portion of the cover panel, and is emitted upwards into the environment to be illuminated through the uplight transmission elements.

15. The light module of claim 14, wherein the cover panel comprises a plurality of reflective angled surfaces on one side of the cover panel.

16. The light module of claim 14, wherein the cover panel comprises light scattering features in the light transmissive portion.

17. The light module of claim 14, wherein the light module is coupled to a luminaire comprising a plurality of luminaire apertures.

18. The light module of claim 17, wherein the plurality of uplight transmission elements are disposed in the plurality of luminaire apertures.

* * * * *